United States Patent [19]

Repinski

[11] 4,274,314
[45] Jun. 23, 1981

[54] CLAMPING DEVICE

[76] Inventor: Bernard Repinski, 120 North St., Sharon, Wis. 53585

[21] Appl. No.: 135,076

[22] Filed: Mar. 28, 1980

[51] Int. Cl.³ ................ B23B 29/00; B23B 5/22; B23B 31/10
[52] U.S. Cl. ................ 82/36 R; 279/16; 408/239 R
[58] Field of Search ........... 82/36 A, 36 R, 34, 45; 279/16, 75; 408/238, 239

[56] References Cited

U.S. PATENT DOCUMENTS

| | | | |
|---|---|---|---|
| 1,540,947 | 6/1925 | O'Brien . | |
| 2,288,907 | 7/1942 | Klute | 279/16 |
| 2,297,064 | 9/1942 | McKinley | 279/16 |
| 2,327,897 | 8/1943 | Howard | 279/16 |
| 3,471,912 | 10/1969 | Johnson | 408/239 R |
| 3,526,410 | 9/1970 | Grover | 279/16 |
| 3,778,071 | 12/1973 | Buck | 279/16 |
| 3,995,514 | 12/1976 | Spang | 82/36 R |
| 4,215,961 | 8/1980 | Babel | 408/239 R |

OTHER PUBLICATIONS

Publication–"The Shop Tool Manual", Published by Brown & Sharp, p. 38 and Exhibit pp. A, B, C, & D.

Primary Examiner—Harrison L. Hinson
Attorney, Agent, or Firm—Quarles & Brady

[57] ABSTRACT

An adjustable tool holder for securing a drill or like tool to the turret of a machine tool includes an axially extending body member, a tool receiving member positioned alongside the body member, and a radially contractible clamping member encircling both the body and tool receiving members. When the clamping member is contracted, the contours of its circular interior cooperate with the contours of the body and tool receiving members to result in an axial positioning of the members.

16 Claims, 6 Drawing Figures

CLAMPING DEVICE

BACKGROUND OF THE INVENTION

This invention relates to a clamping device, and more particularly to an adjustable tool holder for securing a tool to the turret of a machine tool.

Clamping devices are utilized in a wide variety of applications for clamping or fastening one member to another. One form, with which the present invention is primarily concerned, is as a tool holder assembly used for securing drills, reamers, taps and similar tools in the turrets of screw machines, lathes, or similar machine tools. These tool holders provide a mechanical device for centering and aligning the cutting tools with a work piece, and usually includes a bushing which holds the cutting tool clamped to a body member which is mounted to the turret of the machine tool.

It is desirable that a tool holder assembly be adapted to perform multiple functions when used to hold cutting tools in a machine tool. For example, when used to secure a drill bit, the bushing and drill bit must initially be permitted to float laterally and axially with respect to the axis of the body member of the tool holder assembly in order to provide accurate centering and alignment of the drill bit with a work piece. Once the drill bit is properly located, however, the tool holder assembly must also be capable of securely holding the bit and bushing against the body member without any floating action to maintain this desired position with respect to the work piece.

A multiple use tool holder assembly should also be adaptable to hold a reamer or a tap. For example, a reamer requires free axial movement when it is inserted and withdrawn from a predrilled hole in a work piece in order to properly finish the hole. In such a case the tool holder assembly must not only be capable of securely holding the reamer, but also of providing some lateral and axial floating during all phases of the tool's operation.

The prior art has provided a number of tool holder assemblies, all having certain disadvantages. In one of these arrangements, the bushing is clamped to the body of the holder by a pair of clamping bolts disposed axially on opposite sides of the bushing which extend through abutting flanges projecting from the bushing and body. However, there can be a tendency to cause a tilting of the bushing as one or the other of the bolts is tightened causing a misalignment of the tool with the work piece.

Another approach has been to use a threaded tightening collar and locking nut rotatable about the periphery of the bushing and body which clamp the bushing to the body of the holder. However, in this arrangement the rotational movement of the tightening collar can cause an undesirable rotation of the bushing.

None of the above arrangements have been entirely satisfactory, and the present invention has been developed to provide not only an improved clamping device, but also an improved tool holder having multiple uses in which the bushing when clamped to the body is not caused to shift out of position by virtue of the tightening force.

SUMMARY OF THE INVENTION

The present invention relates to a tool holder assembly which includes an axially extending body member, a tool receiving member positioned axially alongside the body member, and a radially contractible clamping member encircling both the body and the tool receiving members. When the clamping member is contracted, the contours of its circular interior cooperate with the contours of the body and tool receiving members to result in an axial positioning of the members.

Usual tool holders include a bushing or tool receiving member which holds the cutting tool secured to a body member which is mounted to the turret of a screw machine, lathe, or similar machine tool. The bushing and cutting tool, however, have a tendency to shift out of alignment, or to rotate, when secured to the body member by virtue of a tightening force. The present invention seeks to solve these problems by providing a tool holder which includes an axially extending body member having an axially facing stop surface, a tool receiving member positioned axially alongside the body member with an axially directed abutment face opposing the stop surface, and a radially contractible ring clamp encircling both the body and tool receiving members. One of the members has an encircling first threaded portion, and the other member has a holding surface directed axially away from the member with the threaded portion. The clamp has a radially inwardly directed second threaded portion in meshing relation with the first threaded portion, and a clamp surface axially opposing the holding surface. When the clamp is contracted, the threaded portions are drawn into one another by virtue of the oblique camming surfaces of one set of threads sliding along the oblique camming surfaces of the other set of threads with a resultant axial clamping of the members together. The sliding of the threads provides an axial clamping force uniformly distributed about the circular interior of the clamp which axially positions the body, tool receiving member and clamp without causing a misalignment of the cutting tool.

The tool holder is adjustable and may clamp the tool receiving member tightly against the body member, as necessary when drilling, by axially displacing the clamp surface tightly up against the holding surface, or it may permit the tool receiving member to be free-floating, as necessary when reaming or tapping, by providing a gap between the clamp surface and the holding surface.

It is a general object of the invention to provide a clamping device for clamping together the ends of a pair of axially disposed cylindrical members.

It is another object of the invention to provide a multiple use tool holder for holding various cutting tools in a machine tool.

It is still another object of the invention to provide a tool holder which is adjustable to permit accurate centering and alignment of a tool with a work piece.

The foregoing and other objects and advantages of the invention will appear from the following description. In the description, reference is made to the accompanying drawings which form a part hereof, and in which there is shown by way of illustration and not of limitation, a preferred embodiment of the invention. Such embodiment does not represent the full scope of the invention, and reference is made to the claims herein for interpreting the breadth of the invention.

DESCRIPTION OF THE PREFERRED EMBODIMENTS

Figure 1:
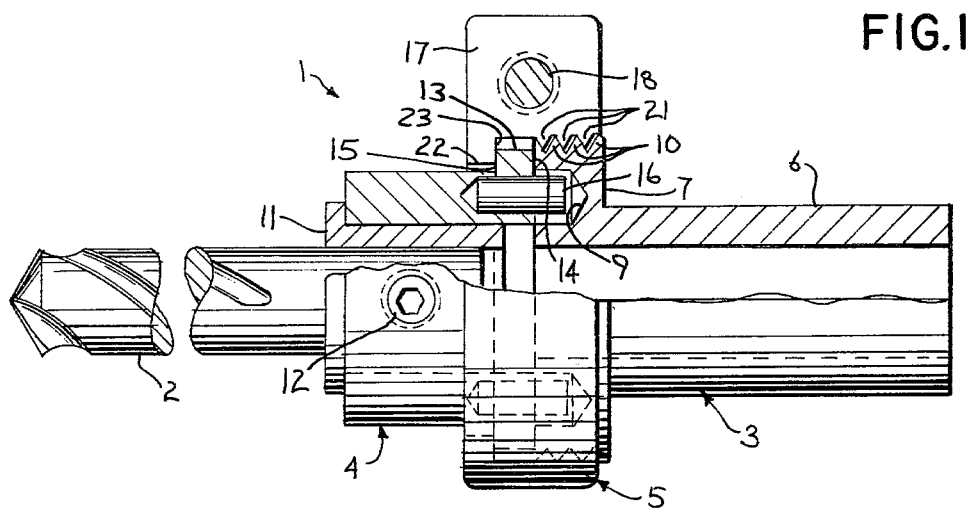
FIG. 1 is a side view in elevation partially in section showing a tool holder constituting a first embodiment of the invention.
Figure 2:
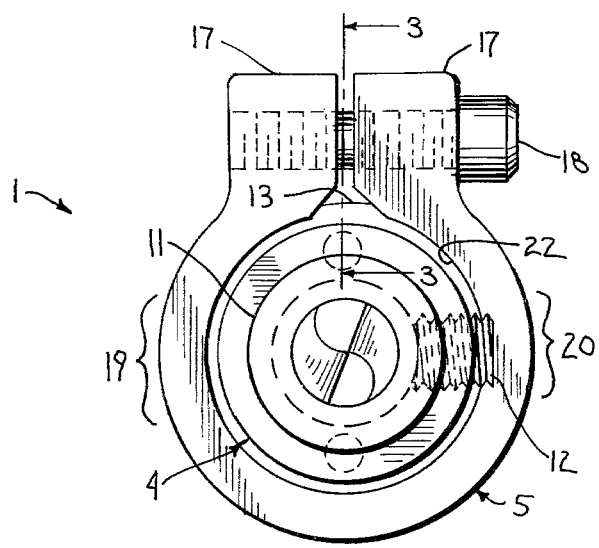
FIG. 2 is an end view of the tool holder taken from the left as shown in FIG. 1.

Referring to the drawings, FIGS. 1 and 2 show a tool holder assembly, generally designated by the numeral 1, for holding a tool 2, such as a drill bit, during machining operations. The tool holder assembly 1 includes a body member 3, a tool receiving bushing 4 and a split ring clamp member 5. The body member 3 has an elongated, hollow cylindrical shank 6 forming one of its ends, and its other end has a radially outwardly projecting annular flange 7. The flange 7 includes a transverse stop surface 8 that faces axially away from the shank end 6, and a pair of axially offset bores 9 are formed in the flange 7 that enter from the surface 8 and are diametrically opposite one another. The radially projecting flange 7 is also formed with external threads 10 around its circumferential perimeter that advance axially along the body member 3. The oblique side faces of these threads 10 provide camming surfaces, the purpose of which will hereinafter be more fully described.

The bushing 4 is coaxially disposed alongside the body member 3 and is in the form of a hollow cylinder that is adapted to receive a split collet 11 which in turn receives the drill bit 2, as shown in FIGS. 1 and 2. A set screw 12 is threaded in the wall of the bushing 4 and may be turned down tightly against the surface of the collet 11 to retain the collet 11 and drill bit 2 securely in place. The bushing 4 also includes an annular rim 13 projecting radially outward at its inner end. The rim 13 has an inner face 14 that is directly opposed to the stop surface 8 of the body 3, so as to form an abutment that can rest against the stop surface 8 whenever the body 3 and bushing 4 are clamped together. The rim 13 also has an axially facing holding surface 15 on its side opposite the abutment face 14, so that the rim 13 can be pinched from opposite directions to hold it in place. A pair of pins 16 extend axially from the abutment face 14 and enter into the axial bores 9 in the stop surface 8 of the body 3 for the purpose of having an interlocking rotation of the body 3 and the bushing 4 whenever one of these parts is turned around their mutual axis. It should be noted that the diameter of the pins 16 is slightly less than the diameter of the axial bores 9 to permit the bushing 4 to be free-floating with respect to the body 3. However, the freedom of movement for the bushing 4 may be slight because of the close position of the clamp member 5, as will be discussed hereinafter.

As shown in FIG. 2, the clamp member 5 is in the form of a split ring that is bifurcated at the top in a radial plane extending through the tool holder axis. The bifurcation defines two ends for the split ring that are in the form of enlarged shoulders 17. The two shoulders 17 have coaxial, threaded openings that receive an adjustment screw 18. When the screw 18 is turned the two shoulders 17 are either drawn toward one another or spread apart. This motion causes the central opening of the ring member 5 to be reduced or enlarged to effect a clamping action of the member 5 around the threaded flange 7 of the body member 3. This drawing together, or conversely spreading apart, of the two shoulders 17 causes the opposite sides 19 and 20 of the clamp member 5 to act as complementary clamping jaws for effecting a locking and positioning of the several parts of the tool holder 1.

Figure 3:
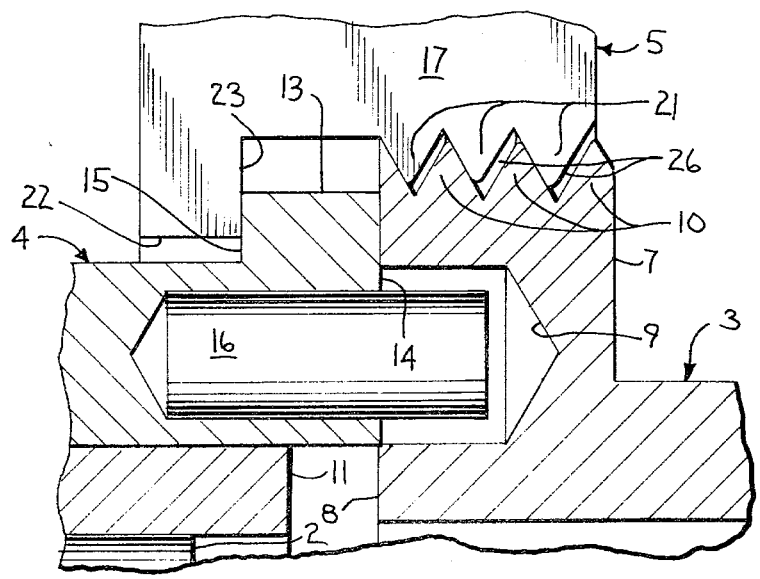
FIG. 3 is an enlarged fragmentary view in section taken in the plane 3—3 indicated in FIG. 2, with wedging threads of the tool holder acting to clamp a tool holding bushing in position.

The circular interior of the clamp member 5 has a complex configuration that is shown in section in FIGS. 1 and 3. Starting at the right in these figures, there are internal threads 21 in mesh with the threads 10 of the body flange 7. The oblique faces of these threads 21 provide camming surfaces engaging the oblique faces of the threads 10, so that upon a contraction of the split ring clamp 5 the threads 21 will be drawn down, into the threads 10 to have the two sets of threads 10, 21 nest deeper within one another. When this occurs, the respective oblique side faces of the threads 10, 21 will act to position the threads in an axial direction with respect to one another, and this positioning may be accomplished by the faces of one set of threads sliding obliquely along the faces of the other set of threads in a cam-like motion.

On the left side in FIGS. 1 and 3, the interior of the split ring clamp 5 is formed with an annular lip or collar 22 that projects radially inward. This lip 22 presents a clamping surface 23 lying in a transverse plane which faces and is engageable with the holding surface 15 of the annular rim 13 that is a part of the bushing 4. Thus, the bushing rim 13 is located inside the interior of the ring clamp 5, and is captured between the stop surface 8 of the body 3 and the lip 22 to retain the bushing 4 in assembly with the other parts.

To assemble the body member 3, bushing 4, and split ring clamp 5, the bushing 4 is inserted through the central opening of the clamp 5 from right to left, as viewed in FIGS. 1 and 3. The external threads 10 on the peripheral surface of the flange 7 of the body member 3 are then engaged with the internal threads 21 of the ring clamp 5, and the body member 3 is turned down into the central opening of the clamp 5 and the pins 16 are received within the axial bores 9.

Figure 6:
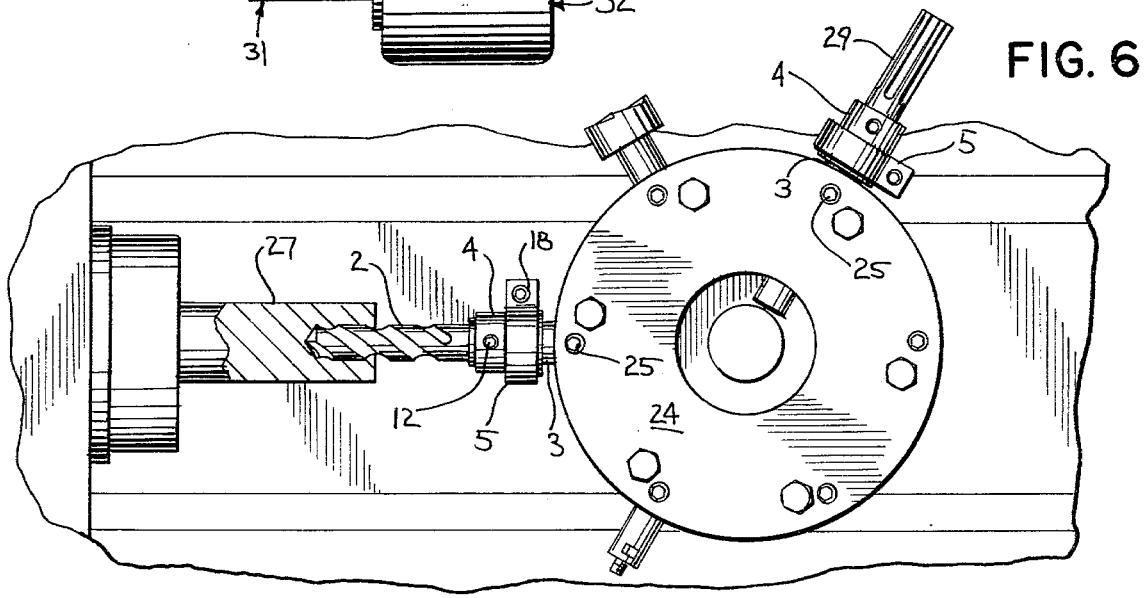
FIG. 6 is a fragmentary side view partially in section showing several cutting tools clamped to the turret of a machine tool.

Referring now to FIG. 6, after the body member 3, bushing 4, and clamp 5 have been assembled as described above, the shank 6 of the body member 3 may be mounted within a turret 24 of a lathe or similar machine tool. The shank 6 of the body member 3 is held securely in the turret 24 by a set screw 25 in the usual manner. The collet 11 and drill bit 2 may then be inserted into the bushing 4 and secured tightly in place by turning down the set screw 12.

It should be noted that at this initial stage of the assembly the lip clamping surface 23 of the clamp 5 overlies, but does not engage the holding surface 15 of the bushing rim 13. The bushing rim 13 is loose between the surface 8 and lip 22. This initial position for the tool holder assembly 1 thus permits the bushing 4 to be free-floating, or to be moved laterally and axially about, with respect to the body member 3. However, the freedom of movement of the bushing 4 is limited because the clamp 5 has the clamping surface 23 of its lip 22 overlapping and in close juxtaposition with the holding surface 15 of the rim 13, and the pins 16 of the bushing 4 received within the axial bores 9 of the body member 3 limit rotational movement of the bushing 4. It should also be noted that in this initial position there is a loose fit between the threads 10 and 21.

With the tool bit 2 and bushing 4 held loosely, the turret 24 may now be moved to the left, as viewed in FIG. 6, to bring the drill bit 2 up to a work piece 27 mounted in the spindle of the machine tool for the purpose of centering the drill bit 2 with respect to the work piece 27. Once the drill bit 2 is properly centered, the ring clamp 5 is manually rotated clockwise, as viewed in FIG. 2, to move the clamp 5 to the right in FIGS. 1 and 3. This rotation of the clamp 5 brings the clamping surface 23 of the lip 22 against the holding surface 15 of the rim 13, as best seen in FIG. 3, and moves the face 14 of the bushing 4 into engagement with the stop surface 8. It should be noted that as the clamp 5 is rotated the pins 16 cooperate with the bores 9, in which they are received, to prevent the bushing 4 from turning with the clamp 5. By moving the clamp 5 to the right, the bushing 4 is now held in place with the rim 13 firmly sandwiched between the surface 8 and rim 22. The threads 10 and 21 will be positioned as shown in FIG. 3, with spaces 26 to the right of the threads 21, and the left sides of the threads 21 resting against the right sides of the threads 10.

After hand tightening the clamp 5, the adjustment screw 18 of the clamp 5 is turned to urge the opposite sides 19 and 20 together to reduce the diameter of the central opening of the clamp 5. The oblique surfaces of the threads 21 of the clamp 5 move against and slide radially inwardly along the oblique surfaces of the threads 10 of the body 3. The interthread spaces 26 accommodate this radially inward motion of the threads 21, and this sliding action causes the external threads 10 and internal threads 21 to wedge against one another with a resultant camming action to axially urge the clamp 5 to the right, as viewed in FIG. 3. The resulting axial force between the threads 10, 21 brings the clamping surface 23 of the lip 22 tightly and securely against the holding surface 15 of the rim 13 to the bushing 4. Also, the stop surface 8 of the flange 7 is clamped tightly against the face 14 of the bushing 4. As a result, a turning of the adjustment screw 18 tightens the clamp structure to hold the bushing 4 securely in place, and the drill bit 2 is held in its proper centered position for acting upon the work piece 27 without being dislodged during a drilling operation.

The tool holder assembly 1 has an alternative use of the one described above, in which the bushing 4 was held tightly in position. It is also possible to have the bushing 4 float freely at all times, and this is useful for reaming and tapping operations. The bushing 4 must be free to float if one desires to have a reamer or threading tap self-align itself with a hole that has previously been drilled in a work piece 27.

Figure 4:
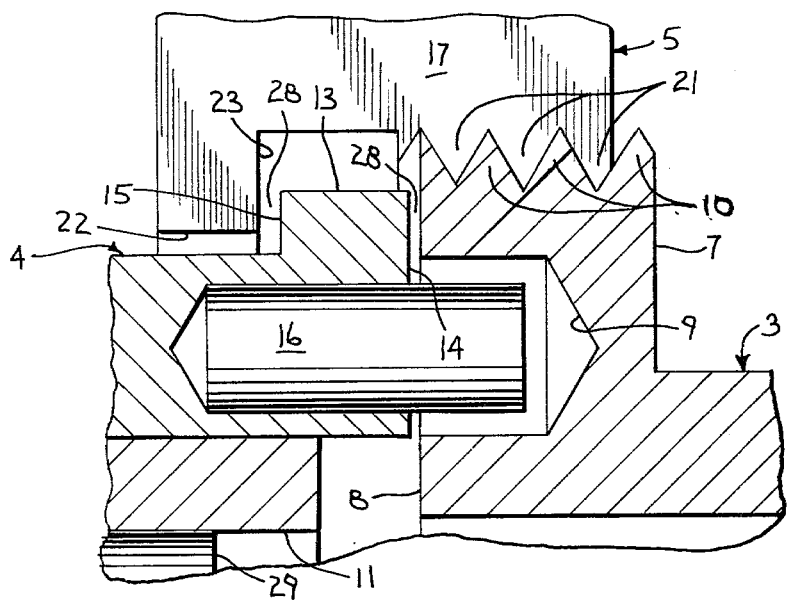
FIG. 4 is an enlarged fragmentary view in section similar to FIG. 3, but with the threads of the tool holder functioning to provide a loose assembly for the tool holding bushing.

Referring now to FIG. 4, free-floating of the bushing 4 is accomplished by an initial adjustment of the clamp member 5. The clamp member 5 is turned to move it to the left to create gaps 28 on opposite sides of the rim 13. This leaves the bushing 4 in a loosely held position. When the clamping screw 18 is now turned to bring the clamp sides 19 and 20 toward one another the internal threads 21 of the clamp 5 will nest in the external threads 10 of the body 3. This holds the clamp 5 tight with the body 3 and the oblique thread surfaces will axially adjust and hold the clamp 5 in position with the bushing rim 13 maintained in a loosely held fashion. The bushing 4 and its tool, such as a reamer 29, can now automatically adjust laterally and axially with respect to the body 3 when it is brought up against a work piece 27, to align its axis with that of the work piece.

Figure 5:
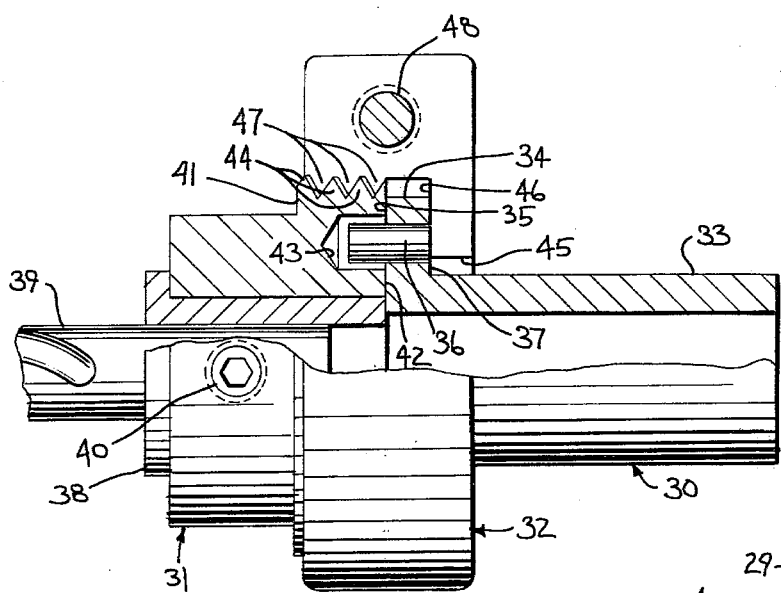
FIG. 5 is a side view in elevation partially in section showing a tool holder constituting a second embodiment of the invention.

FIG. 5 shows a second embodiment comprising a left-hand version of the present invention. The tool holder assembly in FIG. 5 includes a body member 30, a tool receiving bushing 31, and a clamp member 32. The body member 30 has an elongated, hollow cylindrical shank 33 forming one of its ends and at its other end has an annular rim 34 projecting radially outward. The rim 34 includes a transverse stop surface 35 that faces axially away from the shank end 33, and a pair of pins 36 extend axially from the stop surface 35 and are diametrically opposite one another. The rim 34 also has an axially facing holding surface 37 on its side opposite the stop surface 35.

The bushing 31 is coaxially disposed alongside the body member 30 and is in the form of a hollow cylinder that is adapted to receive a split collet 38 which in turn receives a tool, such as a drill bit 39. A set screw 40 is threaded in the wall of the bushing 31 and may be turned down tightly against the surface of the collet 38 to retain the collect 38 and drill bit 39 securely in place. The bushing 31 also includes a flange 41 projecting radially outward at its inner end. The flange 41 has an inner face 42 that is directly opposed to the stop surface 35 of the body 30 which forms an abutment that can rest against the stop surface 35 whenever the body 30 and bushing 31 are clamped together. The flange 41 has a pair of axially offset bores 43 formed therein that enter from the face 42 which are adapted to receive the pins 36 for the purpose of having an interlocking rotation of the body 30 and bushing 31 whenever one of these parts is turned around their mutual axis. The bores 43 also cooperate with the pins 36 to prevent any undesirable rotation of the bushing 31 during adjustment or use of the tool holder. The flange 41 also has a set of external threads 44 formed around its periphery that extend axially along the bushing 31.

The clamp member 32 is similar to the clamp member 5 of the first embodiment, except the contours of the configuration of its circular interior are reversed. As seen in FIG. 5, the right side of the interior of the clamp 32 is formed with an annular lip or collar 45 that projects radially inward. This lip 45 presents a clamping surface 46 lying in a transverse plane which faces and is engageable with the holding surface 37 of the rim 34 of the bushing 31. Thus, the body rim 34 is surrounded by and located inside the interior of the ring clamp 32, and is captured between the face 42 of the bushing 31 and the lip 45.

On the left side in FIG. 5, the interior of the ring clamp 32 has internal threads 47 in mesh with the threads 44 of the bushing flange 41. The oblique faces of these threads 47 provide camming surfaces for engaging the oblique faces of the bushing threads 44, so that upon contraction of the clamp 32 the threads 47 will be drawn into the threads 44 to nest deeper within one another. In a manner similar to the first embodiment, the faces of the threads 47 will slide obliquely along the faces of the threads 44 in a cam-like motion to axially position the body 30, bushing 31 and clamp member 32. In the second embodiment, however, the contraction of the clamp member 32 causes it to move axially to the left, as seen in FIG. 5, whereas the clamp 5 of the first embodiment moved axially to the right, as seen in FIG.

1. Thus, the term left-hand version is used to distinguish the second embodiment.

The body 30, bushing 31, and clamp member 32 are assembled in the same manner as the first embodiment, except in this second embodiment the body 30 must be inserted through the central opening of the clamp 32 from left to right as viewed in FIG. 5, and the bushing 31 is then turned into the member 32. The shank end 33 of the body 30 may then be mounted within the turret 24 of a machine tool, and the collet 38 and drill bit 39 may be inserted into the bushing 31 and secured tightly in place by turning down the set screw 40.

It should be noted that at this initial stage of assembly the clamping surface 46 of the lip 45 of the clamp 32 overlies but does not engage the holding surface 37 of the rim 34 of the body 30. This initial position permits the drill bit 39, bushing 31 and clamp 32 to be free-floating with respect to the body 30. As a result, when the turret 24 is moved to the left, as viewed in FIG. 6, to bring the drill bit 39 up against the rotating work piece 27, the drill bit 39, bushing 31 and clamp 32 will move relative to the body 30 to align the axis of the drill bit 39 with the axis of the work piece 27. The clamp 32 may then be manually rotated counterclockwise (for right-hand threads), as viewed from the left in FIG. 5, to engage the stop surface 35 of body 30 against the face 42 of the bushing 31, and clamping surface 46 of the lip 45 against the holding surface 37 of the rim 34.

The clamp 32 is then securely tightened around the body 30 and bushing 31 by turning an adjustment screw 48 extending through the shoulders of the clamp 32. When the screw 48 is turned to move the sides of the clamp 32 together, the diameter of the central opening of the clamp is reduced. This reduction in diameter causes oblique surfaces of the threads 47 of the clamp 32 to move against and slide along oblique surfaces of the threads 44 of the bushing 31. This sliding action causes the threads 44, 47 to wedge with one another so as to urge the clamp member 32 to the left, as viewed in FIG. 5. The resulting axial force on the clamp 32 brings its clamping surface 46 tightly up against the holding surface 37 of the rim 34 of the body 30, and the stop surface 35 of the body 30 in abutting relation with the face 42 of the bushing 31. As a result the bushing 31 and drill bit 39 are clamped tightly to the body 30.

The tool holder assembly shown in FIG. 5 may also be used to permit the drill bit 39, bushing 31 and clamp 32 to be free-floating at all times. This is accomplished in a manner similar to that for the first embodiment, or right-hand version, of the tool holder assembly. The tool holder of FIG. 5 may thus be assembled so that a gap is formed between the clamping surface 46 of the lip 45 and the holding surface 37 of the rim 34. When the clamp 32 is tightened its threads 47 will nest into the threads 44 and become firmly fixed in position with the bushing 31 and clamp 32 tightly secured to one another. However, both the clamp 32 and bushing 31 are free to float laterally so that the drill bit 39 can automatically adjust to its proper position when it is brought up against the work piece 27.

A tool holder has been shown and described which includes a body member 3, 30 having an axially facing stop surface 8, 35, a tool receiving bushing 4, 31 positioned axially alongside the body 3, 30 with an axially directed abutment face 14, 42 opposing the stop surface 8, 35, and a clamp member 5, 32 encircling both the body 3, 30 and tool receiving bushing 4, 31. In the first embodiment, the body 3 has a set of encircling threads 10 that advance axially along its length, and the bushing 4 has a holding surface 15 directed axially away from the body 3. In the second embodiment, the body 30 has the holding surface 37, and the bushing 31 has the set of axially advancing threads 44. In both embodiments, the clamping member 5, 32 has a radially inwardly directed second set of threads 21, 47 in meshing relation with the first set of threads 10, 44, and a clamp surface 23, 46 axially opposing the holding surface 15, 37. In operation, the clamp member 5, 32 is axially displaced to clamp the bushing 4, 31 and body 3, 30 together by virtue of the oblique surfaces of its threads 21, 47 sliding along the oblique surfaces of the threads 10, 44 in a cam-like motion in response to the sides of the clamp 5, 32 being radially contracted. The sliding action of the oblique surfaces of the threads 10, 44 and 21, 47 provides an axial clamping force uniformly distributed about the central opening of the clamp member 5, 32 which displaces the clamp member 5, 32 without causing a misalignment of the body 3, 30 and bushing 4, 31.

While the preferred embodiments of the invention have been shown and described, it is obvious that the present invention is suitable for a variety of applications where it is desired to axially clamp together two elongate cylindrical members. For example, the invention may be used to couple two drive shafts together. It is also obvious that the oblique camming surfaces need not necessarily be formed as continuous threads. Also, the clamp members 5, 32 may be split at both ends in which case two separate arcuate clamping jaws may be formed. Hence, the breadth of the invention is not limited to the specific embodiments shown.

I claim:

1. In a tool holder the combination comprising:
   (a) an axially extending body member having an axially facing stop surface;
   (b) a tool receiving member positioned axially alongside said body member with an axially directed abutment face opposing said stop surface;
   (c) one of said members having an external first oblique camming surface that extends circumferentially of such member;
   (d) the other of said members having a holding surface directed axially away from the member with said first oblique camming surface;
   (e) a clamping member radially outside said body and tool receiving members, said clamping member having a radially inward directed second oblique camming surface that extends circumferentially in meshing relation with said first oblique camming surface, and a clamp surface axially opposing said holding surface of said member; and
   (f) said clamping member being radially contractible to draw said first and second oblique camming surfaces together with a resultant axial positioning of the members.

2. A tool holder according to claim 1, wherein:
   said first and second oblique camming surfaces are formed as threads.

3. A tool holder according to claim 1, wherein:
   said other of said members includes an annular rim projecting radially outward; and
   said holding surface is formed along the side of said rim.

4. A tool holder according to claim 1, wherein:
   said one of said members includes an annular lip projecting radially inward; and
   said clamp surface is formed along the side of said lip.

5. In a tool holder the combination comprising:
(a) an axially extending body member having an axially facing stop surface;
(b) a tool receiving member positioned axially alongside said body member with an axially directed abutment face opposing said stop surface;
(c) one of said members having an encircling first threaded portion that advances axially along the member;
(d) the other of said members having a holding surface directed axially away from the member with said threaded portion;
(e) a clamping member encircling both said body and tool receiving members, said clamping member having a radially inward directed second threaded portion in meshing relation with said first threaded portion, and a clamp surface axially opposing said holding surface of said other member; and
(f) said clamping member being radially contractible to draw said threaded portions into one another with a resultant axial positioning of the members.

6. A tool holder according to claim 5, wherein:
said first threaded portion is disposed on said body member; and
said holding surface is disposed on said tool receiving member.

7. A tool holder according to claim 5, wherein:
said first threaded portion is disposed on said tool receiving member; and
said holding surface is disposed on said body member.

8. In a tool holder the combination comprising:
(a) an axially extending body member having a mounting shank at one end and a stop surface facing axially away from said shank;
(b) a tool receiving member positions axially alongside said body member with an axially directed abutment face opposing said stop surface;
(c) one of said members having external threads which advance axially of the member;
(d) the other of said members having a circumferential rim providing a holding surface directed axially away from the member with said threaded portion;
(e) a split ring clamping member encircling both said body and tool receiving members, said clamp member having internal threads in mesh with said external threads, and a lip overlapping said circumferential rim of said other member to axially oppose said holding surface of said rim; and
(f) said split ring clamping member being bifurcated in an axial extending plane to present opposite sides that can be drawn together to wedge said external and internal threads with one another to axially position the members.

9. A tool holder according to claim 8, wherein:
said one of said members includes a radially projecting flange; and
said external threads are formed on the periphery of said flange.

10. A tool holder according to claim 8, wherein:
said internal threads and said lip project radially inward from the circular interior of said split ring clamping member.

11. In a tool holder the combination comprising:
(a) an axially extending body member having a mounting shank and an axially facing stop surface;
(b) a tool receiving member positioned axially alongside said body member with an axially directed abutment face opposing said stop surface;
(c) one of said members having an external first threaded portion presenting a first oblique camming surface that extends circumferentially along opposite sides of such member;
(d) the other of said members having a circumferential rim providing a holding surface directed axially away from said member with said threaded portion;
(e) a split ring clamping member encircling both said body and tool receiving members, said clamping member having a radially inward directed second threaded portion presenting a second oblique camming surface that extends circumferentially in meshing relation with said first oblique camming surface, and a lip overlapping said circumferential rim of said other member to axially oppose said holding surface of said rim; and
(f) said split ring clamping member being bifurcated in an axially extending plane to define opposite sides that can be drawn together to wedge said first and second oblique camming surfaces together with a resulant axial positioning of the several members.

12. A tool holder according to claim 11, wherein:
said first threaded portion is disposed on said body member; and
said tool receiving member includes a pin extending axially from said abutment face which enters into an axially offset bore formed in said stop surface.

13. A tool holder according to claim 11, wherein:
said first threaded portion is disposed on said tool receiving member, and
said body member includes a pin extending axially from said stop surface which enters into an axially offset bore formed in said abutment face.

14. In a tool holder the combination comprising:
(a) an axial extending body member having a mounting shank and an axially facing stop surface;
(b) a tool receiving member positioned axially alongside said body member with an axially directed abutment face opposing said stop surface;
(c) one of said members having an external first threaded portion presenting a first oblique camming surface that extends circumferentially along opposite sides of such member;
(d) the other of said members having a circumferential rim providing a holding surface directed axially away from the member with said threaded portion;
(e) a split ring clamping member encircling both said body and tool receiving members, said clamp member having a radially inward directed second threaded portion presenting a second oblique camming surface that extends circumferentially in mesh relation with said first oblique camming surface, and a lip axially opposing said holding surface of said other of said members; and
(f) said split ring clamping member being bifurcated in an axial extending plane to present opposite sides that can be drawn together to wedge said first and second oblique camming surfaces together with a resultant axial positioning of the members.

15. In a tool holder the combination comprising:
(a) a body member having a mounting shank at one end and a stop surface at the other end;
(b) a tool receiving member positioned alongside said stop surface of said body member to be engageable therewith;

(c) one of said members having first threads that encircle the member;

(d) the other of said members having a circumferential rim;

(e) a split ring clamping member encircling said first threads and said circumferential rim, said clamp member having internal second threads that are in mesh with said first threads, and a lip overlapping said rim to enclose the rim within said clamping member; and (f) means for contracting said split ring clamping member to draw said first and second threads radially together for positioning the members.

16. A tool holder according to claim 15, wherein:

said means for contracting said split ring clamping member includes a pair of integrally formed shoulders that project radially outward from the ends of said clamping member, said shoulders disposed in opposing relation to one another; and a screw extending through said opposing pair of shoulders.

* * * * *